United States Patent Office 3,536,575
Patented Oct. 27, 1970

3,536,575
CONSTRUCTION ELEMENT OF PHENOLIC RESIN AND PROCESS FOR ITS MANUFACTURE
Raymond Désiré Maitrot, 27 Rue Vital, Paris, France
No Drawing. Filed Sept. 5, 1967, Ser. No. 665,950
Claims priority, application France, Sept. 5, 1966, 75,250
Int. Cl. B32b 5/20, 27/00
U.S. Cl. 161—159    12 Claims

ABSTRACT OF THE DISCLOSURE

A construction product is formed by pouring a mixture of phenol formaldehyde resin setting at room temperature with a swelling agent and a hardening agent consisting of an acid diluted in alcohol into a lined mold so that upon its removal a sandwich-like member is provided with a cellular panel positioned between exterior linings of metal, wood, paper, fabrics and the like. The mixture is supplied into the mold in a predetermined amount for filling the spaces in the mold when the setting reaction is completed.

---

The invention has for its object a construction element of phenolic resin and a process for its manufacture.

It is an object of the invention to provide a construction element which is light, non combustible, which possesses also high heat and sound insulating qualities and, thus, can enter into the constitution of residential buildings or be used in naval, aircraft or space engineering.

It is a particular object of the invention to provide an element which can be used for the manufacure of partition walls, bulkheads, ceilings, floors or walls.

It is also an object of the invention to provide such a construction element which may be obtained according to embodiments covering a very extensive range of applications, and which differ between themselves by the shape and/or contour and/or size and/or outer appearance.

It is in this regard an object of the invention to provide an element which may be used for the erection of a roofing, if necessary in a single piece, the appearance and properties of which are those desired for such an application.

It is also an object of the invention to provide a construction element which, if necessary, can be rapidly repaired.

It is a further object of the invention to provide a process of manufacture which is in practice extremely simple and rapid enabling construction elements to be obtained at an exceptionally low cost price.

It is, in this respect, an object of the invention to provide a process which can be practised on the scale of a single workman, or, on the contrary, on the scale of mass production.

For the manufacture of construction elements according to the invention, there is first prepared a liquid phenolic resin by the reaction of a mixture of phenol and caustic soda with formol, then neutralisation, decantation and dehydration.

The invention provides the manufacture of mixed construction elements that is comprising one or two linings and a core or body of cellular material and it is a feature of the invention to obtain the lining and the core from the same phenolic resin or related or similar phenolic resins.

Before its hardening, which may take place in the cold, the phenolic resin receives an adjuvant which enables a hardened resin to be obtained having remarkable and constant qualities, such an adjuvant being selected from the group consisting of glycerine maleic anhydride and butyl phthalate and even other materials with similar chemical properties.

Both for the constitution of the lining and for that of the core, the phenolic resin is advantageously applied by spray gun or flowing.

Preparation of the resin

It is advantageously obtained in a water-bath, by first mixing almost liquid phenol and caustic soda, then adding to its formol. For 15 kg. of phenol, for example, the quantity of caustic soda is comprised between 1.3 kg. and 1.6 kg.

The formol is added only after stirring the mixture continuously for fifty minutes to an hour. In the case of a commercial formol 30, the quantity added is comprised between 16 kg. and 20 kg. The water bath is then heated so as to bring it to a temperature comprised between 70° and 80° C., for a period of at least two hours. The heating is stopped and the mixture is allowed to stand for at least twenty-four hours.

Adjustment of the pH of the resin

The resin thus formed is removed from the apparatus, and poured into another vat containing a mixer. It is treated with a stirring with an aqueous solution of acid the acidity of which is comprised between 6° Bé. and 9° Bé. and advantageously 7° Bé., and this, until a pH is obtained near neutrality. Hydrochloric acid or phosphoric acid is advantageously used.

Decantation and dehydration

The neutralised resin is then subjected to decantation; it is washed with pure water, it is allowed to redecant and to obtain the desired viscosity, it is largely dehydrated either under vacuum, advantageously between 40° and 50° C., by ageing.

This resin is used for the manufacture of construction elements according to the invention: bulkheads, walls, partition walls, ceilings, floorings, roofings, etc. . . . the core of which in phenolic cellular material confers qualities of incombustibility, rigidity, mechanical strength and heat and sound insulation.

Preparation of the mould

There is described, by way of example, the preparation of a mould for the manufacture of a roofing imitating a tiled roof.

The mould the shape of which corresponds to that of the construction element which it is desired to manufacture, for example a roof imitating a tiled roof, can be of various materials, a suitable material being rubber. The mould is placed flat, by its base, on the fabrication area. In view of facilitating the subsequent demoulding, the inner surface of the mould is advantageously covered with a film of a mould release material, for example a film of stripper or of lead, advantageously obtained by metallisation. For the manufacture of a flat element the dimensions of which are relatively large, one of the edges of small height of the bowl formed by the mould can be detachable or hinged. The demoulding may also be obtained by loosening of the rubber.

Manufacture of the outer lining

To the liquid phenolic resin obtained as indicated, there is added if necessary organic or mineral fillers and pigments, in view of obtaining the final decorative effect desired. The phenolic resin chosen has advantageously a relatively small viscosity, for instance from 20 to 25 poises. To this phenolic resin is added an adjuvant selected from the group consisting of glycerine maleic anhydride, butyl phthalate or other materials of similar chemical properties.

The glycerine maleic anhydride is a mixture, in substantially equal parts, of maleic anhydride and glycerine. It has been noted that the polymerised or hardened resins, for instance the linings obtained from a liquid phenolic resin and such an adjuvant, were free of faults, and that a certain plasticity was conferred to the resin by the adjuvant.

The proportion of adjuvant is of the order of 10% to 15% of the weight of the resin.

The hardener is added to the mixture of liquid phenolic resin and adjuvant. The acid hardener is selected from the group consisting of sulfuric acid and benzene-sulfonic acid, the degree of acidity being restored by alcohol between 10° and 26° advantageously to 22° Bé.

In a general manner, the amount of the harened to be added varies according to the conditions of use of the resin. In the case of a mixture of resin and hardener in a bowl in the open air and standing in mass, the proportions vary according to the ambient temperature, and, also according to the amount of resin treated.

In the case where, on the contrary, the mixture is applied by projection or spreading, the proportion of hardener depends principally on the ambient temperature. The table below gives data in this respect:

|  | Mixture in mass | Mixture spread, approx. percent |
|---|---|---|
| At 15° C.: |  |  |
| 100 g. of resin require 12% | Approx. hardener at 22 Bé. | 18 |
| 1,000 g. of resin require 10% | do | 18 |
| 5,000 g. of resin require 9% | do | 18 |
| At 20° C.: |  |  |
| 100 g. of resin require 11% | do | 16 |
| 1,000 g. of resin require 9% | do | 16 |
| 5,000 g. of resin require 7% | do | 16 |
| At 25° C.: |  |  |
| 100 g. of resin require 9% | do | 14 |
| 1,000 g. of resin require 7% | do | 14 |
| 5,000 g. of resin require 5% | do | 14 |
| At 30° C.:[1] |  |  |
| 100 g. of resin require 7% | do | 13 |
| 1,000 g. of resin require 5% | do | 13 |
| 5,000 g. of resin require 4% | do | 13 |

[1] Up to 45/50° C. the percentages decrease.

The last column of the above table is for the case when the mixture is applied by projection or spreading.

If a less rapid setting is desired, in mass, the percentage of hardener to reduced by about 1% for a 22° Bé. acid.

If the degree of acidity of the hardener is less than 22° Bé., the percentage of hardener is increased and, inversely, if it is higher than 20° Bé., the percentage is reduced.

The percentage must be understood with respect to the resin.

Eventually, the resin may be hardened without hardener, by the sole use of heat.

To obtain the lining after mixture of the liquid phenolic resin, adjuvant and hardener, it is immediately applied by a spray gun in the mould according to the thickness desired, for Example 1 to 2 mm., in one or several times, and after each spraying, polymerisation is allowed to take place.

After complete hardening, there is placed on the hardened layer a reinforcement which can be of glass cloth, or iron or another metal, the latter being previously coated with a paint compatible with the resin, and a new layer of the mixture of resin, adjuvant and hardener is flowed onto the assembly, according to a variable thickness so as to encase the reinforcement.

Manufacture of the core of cellular material

On the reinforced lining thus obtained, just after flowing the last layer, which gains time, or indeed after hardening of the latter, the mixture intended to form the body of cellular material is flowed on.

This mixture comprises a liquid phenolic resin obtained as indicated above, the viscosity of which may be higher, for example, of the order of 40 poises. To this resin, the blowing agent is added, in the form of a powder itself constituted by a mixture of di-nitroso-pentamethylene-tetramine, bicarbonate of soda and talc or other extremely fine powders of any other product, for example kaolin, kieselguhr, etc. enabling a better distribution of the di-nitroso-pentamethylene-tetramine and of the bicarbonate, and advantageously also butyl phthalate, or glycerine maleic anhydride or another material with similar chemical properties.

Suitable proportions with respect to the resin are for example—

Di-nitroso-pentamethylene-tetramine: 1 to 4% by weight of the resin.
Talc: 15 to 22% by weight of the resin.
Bicarbonate of soda: 1 to 50% by weight of the talc or of the distributing powder.
Butyl phthalate: 1 to 5% by weight of the resin.

The duration of the operation of mixing depends on the total mass. In the case of an industrial mass, the stirring is pursued for a sufficient time to achieve a homogeneous mixture, which is not disadvantageous by reason of the relative stability of the mixture.

After stirring, the mixture is advantageously subjected to the action of grinding mills, for example similar to those used in the paint industry, and this, in order to obtain a more completely homogeneous product.

It is to this stable mass which has the consistency of a cream, that is added with rapid stirring the hardener, in a proportion comprised between 16 and 40% by volume according to the blowing agent used and, immediately, the mixture is flowed into the mould, on the lining, reinforced or not, previously fabricated.

The quantity flowed is that suitable for obtaining the desired thickness of the element.

The hardening is allowed to take place and demoulding is carried out. There is directly obtained a useful construction element.

Fabrication of a second lining

If necessary, the cellular material can be coated with a second lining. The latter may be a plywood, or wood, or paper etc.

There may also be applied a metallic sheet or a sheet of fibro-cement or of plastic material, coated with a glue compatible with the cellular material.

There may also be manufactured, in a laminate material according to the invention, linings for flat roofs, gutters, pipes, etc. . . . with a reinforcement of glass cloth, or glass mats or metallic gauze, and also ground coverings.

There may also be manufactured in a similar way, a partition wall or a wall with its openings (windows and doors), its linings, the partition wall comprising eventually an inner reinforcement.

Modification

In a modification, after manufacture of the reinforced lining, the mould is set up again. The mould is closed by a panel intended to constitute the second lining and it is into the gap between the two linings that there is flowed vertically the mixed phenolic resin with the blowing agent and the hardener, for obtaining the cellular material forming the body of the element, and this according to a process analogous to the banchage used for the fabrication of elements of cement.

Bulkheads, partition walls, walls, ceilings, floors

In the case of the manufacture of bulkheads, ceiling, floor, wall or partition wall elements, the mixture intended to form the body of cellular material is flowed vertically in a single operation, if necessary between two linings: wood, plywoods, "Formica" or similar materials previously placed in a mould or between two banches or spaced form members the distance of which corresponds to the final thickness desired for the element. The banches, have previously, been coated, on their parts intended to come into contact with the resin, or the foaming mixture, with a film of a stripping material: paraffin, silicone, etc. or of lead, advantageously applied by metallisation.

When there is employed linings of metallic sheets, sheets of fibro-cement or similar material, plastics material, etc. . . . said sheets are advantageously coated with a glue compatible with the resin, its hardener and the cellular material.

Further modification

The flow is effected horizontally with a device made of movable hoppers with regulatable discharge, fed continuously with the mixture intended to form the cellular material.

There is then placed on the fabrication area the final lining desired, on which is placed or glued a border, of wood for example, or of another material, having a height corresponding to the thickness desired for the cellular material; eventually, there is also placed a reinforcement or frames or pipes. There is then deposited on the whole, by hoppers the mixture intended to form the body of cellular material. It is completed by positioning the second lining.

Various articles

There may also be manufactured insulating shelves for pipes or heating plates.

There may also be manufactured laminated or expanded materials having an excellent thermal behaviour by mixing the resin with non combustible products: silica, graphite, vermiculite, etc. . . .

In all cases, the body or core of the element may comprise embedded in the midst of the cellular material hollows or tubes of pasteboard or of other materials of different nature, for the passage of electricity, of waters, gas, etc. . . ., these hollows lightening the elements and the pasteboard tubes or tubes of other materials reinforcing the latter.

What is claimed is:

1. The method of producing a sandwichlike construction product with a cellular core and linings adhering to said core, comprising providing a mold for the product to be formed, placing the linings on the walls of said mold, filling the space between the linings in the mold with a mixture of phenol formaldehyde resin setting at room temperature a swelling agent and a hardening agent consisting of an acid diluted in alcohol, swelling and hardening said mixture at room temperature, and thereafter removing the finished product from the mold.

2. The method according to claim 1, wherein positioning the mold and the linings substantially vertically prior to the pouring of the mixture of phenol formaldehyde resin, swelling agent and hardening agent.

3. The method according to claim 1, wherein prior to pouring the mixture of phenol formaldehyde resin, swelling agent and hardening agent into the mold, placing into the mold tubes adapted to provide a construction product formed with passages for conducting water, gas, and electricity through the product.

4. The method according to claim 1, wherein prior to pouring the mixture of phenol formaldehyde resin, swelling agent and hardening agent into the mold, placing means for reinforcing the structure of the product into the mold.

5. The method according to claim 1, wherein the mixture poured between the linings provided on the walls of said mold comprises a phenol formaldehyde resin setting at room temperature having a substantially neutral pH and being substantially free of water, a hardening agent in an amount ranging from 16 to 40% of the resin selected from the group consisting of sulfonic acid and benzene sulfonic acid diluted in alcohol to bring its density between 10 and 26° Baumé, and a powder made of a mixture of dinitriso-pentamethylene-tetramine, soda bicarbonate and talc.

6. The method according to claim 5, wherein the mixture poured between the linings further comprises from 1 to 5% by weight of butyl phthalate.

7. The method according to claim 1, wherein the mixture poured between the linings comprises a phenol formaldehyde resin setting at room temperature having a substantially neutral pH and being substantially free of water, a hardening agent in an amount ranging from 16 to 40% of the resin selected from the group consisting of sulfonic acid and benzene sulfonic acid diluted in alcohol to bring its density between 10 and 26° Baumé, 1 to 4% by weight of the resin of di-nitriso-pentamethylene-tetramine, 15 to 22% by weight of the resin of talc, 1 to 50% by weight of the talc of soda bicarbonate, and 1 to 5% by weigth of butyl phthalate.

8. The method according to claim 1, wherein at least one lining is a metal sheet and wherein applying to said sheet, prior to pouring the mixture of phenol formaldehyde, swelling agent and hardening agent, a bonding agent compatible with the mixture for preventing an acid type attack reaction of the sheet by the mixture.

9. The method according to claim 1, wherein at least one lining is a sheet of cementitious material and wherein applying to said sheet, prior to pouring the mixture of phenol formaldehyde resin, swelling agent and hardening agent, a bonding agent compatible with the mixture for preventing a basic type attack reaction on the sheet by the mixture.

10. A sandwich-like construction product comprising a pair of spaced exterior linings, a cellular core disposed between and integral with said exterior linings, said cellular core composed of a mixture of phenol formaldehyde resin setting at room temperature having a substantially neutral pH and being substantially free of water, a hardening agent in an amount ranging from 16 to 40% of the resin selected from the group consisting of sulfonic acid and benzene sulfonic acid diluted in alcohol to bring its density between 10 and 26° Baumé, and a swelling agent.

11. A product according to claim 10, wherein the mixture poured between said linings comprises at least one refractory material selected from the group consisting of silica, graphite, vermiculite, kaolin and kieselquhr.

12. A cellular panel composed of a mixture of phenol formaldehyde resin setting at room temperature having a substantially neutral pH and being substantially free of water, a hardening agent in an amount ranging from 16 to 40% of the resin selected from the group consisting of sulfonic acid and benzene sulfonic acid diluted in alcohol to bring its density between 10 and 26° Baumé, 1 to 4% by weight of the ersin of di-nitrisopentamethylene-tetramine, 15 to 22% by weight of the resin of talc, 1 to 50% by weight of the talc of soda bicarbonate, and 1 to 5% by weight of butyl phthalate.

References Cited

UNITED STATES PATENTS

| 2,376,653 | 5/1945 | Boyer | 264—45 |
| 2,582,228 | 1/1952 | Brinkema | 264—45 |
| 2,975,488 | 3/1961 | Brauner | 264—45 |
| 3,081,269 | 3/1963 | Shannon et al. | 260—2.5 |
| 3,158,529 | 11/1964 | Robitschek | 161—161 |
| 3,415,714 | 12/1968 | Hider | 161—161 |

WILLIAM J. VAN BALEN, Primary Examiner

U.S. Cl. X.R.

161—160, 161, 215, 257; 264—46; 156—79; 260—2.5